US008390722B1

(12) United States Patent
Gruneisen et al.

(10) Patent No.: US 8,390,722 B1
(45) Date of Patent: Mar. 5, 2013

(54) MOSAIC IMAGER USING WAVE FRONT CONTROL

(75) Inventors: Mark T. Gruneisen, Tijeras, NM (US); Matthew B. Garvin, Wright Patterson Air Force Base, OH (US); Raymond C. Dymale, Albuquerque, NM (US); James R. Rotge, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 669 days.

(21) Appl. No.: 12/495,674

(22) Filed: Jun. 30, 2009

Related U.S. Application Data

(62) Division of application No. 11/782,547, filed on Jul. 24, 2007, now Pat. No. 7,576,308.

(60) Provisional application No. 60/833,970, filed on Jul. 28, 2006.

(51) Int. Cl.
*H04N 5/232* (2006.01)
*G02B 13/16* (2006.01)

(52) U.S. Cl. .................................................... 348/335

(58) Field of Classification Search ............... 348/335; 250/201.3; 356/512
See application file for complete search history.

(56) References Cited

U.S. PATENT DOCUMENTS

| 7,616,897 B2 * | 11/2009 | Graves ..................... 398/129 |
| 2002/0176090 A1 * | 11/2002 | Ohsaki et al. ............. 356/512 |
| 2007/0007428 A1 * | 1/2007 | Ri ........................... 250/201.3 |
| 2007/0258095 A1 * | 11/2007 | Olivier et al. ............. 356/479 |

OTHER PUBLICATIONS

"Quick Review Canon Powershot A40 Digital Camera," The Imaging Resource, http://www.imaging-resource.com/PRODS/A40/A40A.HTM (Apr. 2, 2002).
M. T. Gruneisen, L. F. Desandre, J. R. Rotge, R. C. Dymale and D. L. Lubin, "Programmable diffractive optics for wide-dynamic range wavefront control using liquid-crystal spatial light modulators," Opt. Eng., vol. 43, No. 6, 1387-1393 (Jun. 2004).
M. T. Gruneisen, R. C. Dymale, J. R. Rotge, L. F. Desandre and D. L. Lubin, "Compensated telescope system with programmable diffractive optic," Opt. Eng., vol. 44, No. 2, 1387-1393 (Feb. 2005).
M. T. Gruneisen, M. B. Garvin, R. C. Dymale, and J. R. Rotge, "Agile-field telescope system with diffractive wavefront control," Advanced Wavefront Control: Methods, Devices, and Applications III, edited by M. T. Gruneisen, J. D. Gonglewski and M. K. Giles, Proceedings of SPIE, vol. 5894, SPIE (Bellingham, WA 2005).
M. T. Gruneisen, M. B. Garvin, R. C. Dymale, and J. R. Rotge, "Mosaic Imaging with Spatial Light Modulator Technology," Applied Optics, vol. 45, No. 28 (Oct. 2006).

(Continued)

*Primary Examiner* — Gevell Selby
(74) *Attorney, Agent, or Firm* — James M. Skorich

(57) ABSTRACT

A wave front control system ("WFCS") organizes the object scene into a mosaic comprised of a grid of segments and transmits each segment in a temporal sequence. The WFCS steers the light fronts emanating from each segment, one segment at a time, through a series of optical components that transmit the light fronts respectively emanating from each segment onto a digital imaging sensor. An optical recording device records each sensed segment, and the object scene is composed by assembling the recorded segments. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

13 Claims, 10 Drawing Sheets

OTHER PUBLICATIONS

B. Potsaid, Y. Bellouard and J. T. Wen, "Adaptive Scanning Optical Microscope (ASOP): A multidisciplinary optical microscope design for large field of view and high resolution imaging," Optics Express, vol. 13, No. 17, 6504-6518 (Aug. 22, 2005).

G. Garcia-Torales, M. Strojnik and G. Paez, "Risley prisms to control wave-front tilt and displacement in a vectorial shearing interferometer," Applied Optics, vol. 41, No. 7, 1380-1384 (Mar. 1, 2002).

M. T. Gruneisen, R. C. Dymale, J. R. Rotge, and D. L. Lubin, "Near-diffraction-limited compensated imaging and laser wavefront control with programmable diffractive optics," High-Resolution Wavefront Control: Methods, Devices, and Applications IV, edited by J. D. Gonglewski, M. A. Vorontsov, M. T. Gruneisen, S. R. Restaino, R. K. Tyson, Proceedings of SPIE, vol. 4825, 147-157, SPIE (Bellingham, WA 2002).

G. Love, "Wave-front correction and production of Zernike modes with a liquid-crystal spatial light modulator," Applied Optics, vol. 36, No. 7, 1517-1524 (Mar. 1, 1997).

M. T. Gruneisen, R. C. Dymale, J. R. Rotge, L. F. Desandre and D. L. Lubin, "Wavelength-dependent characteristics of a telescope system with diffractive wavefront control," Opt. Eng., vol. 44, No. 6 (Jun. 2005).

M. T. Gruneisen, T. Martinez and D. L. Lubin, "Dynamic Holography for High-Dynamic-Range Two-Dimensional Laser Wavefront Control," High-Resolution Wavefront Control: Methods, Devices, and Applications III, edited by J. D. Gonglewski, M. A. Vorontsov, M. T. Gruneisen, Proceedings of SPIE, vol. 4493, 224-238, SPIE (Bellingham, WA 2002).

* cited by examiner

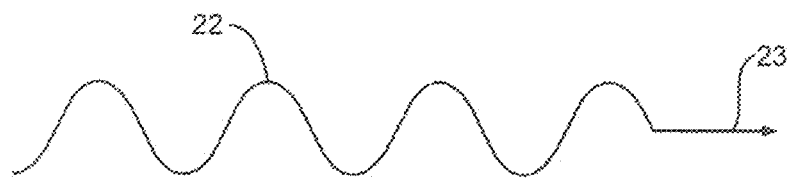
Fig. 1
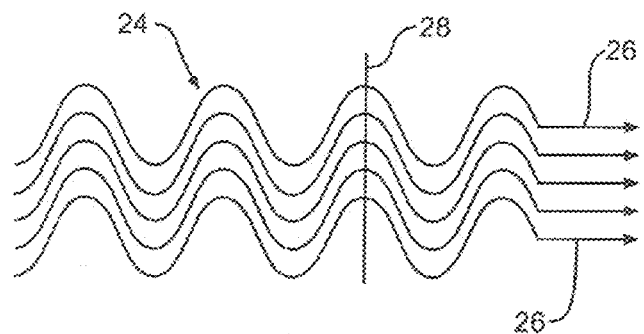
Fig. 2
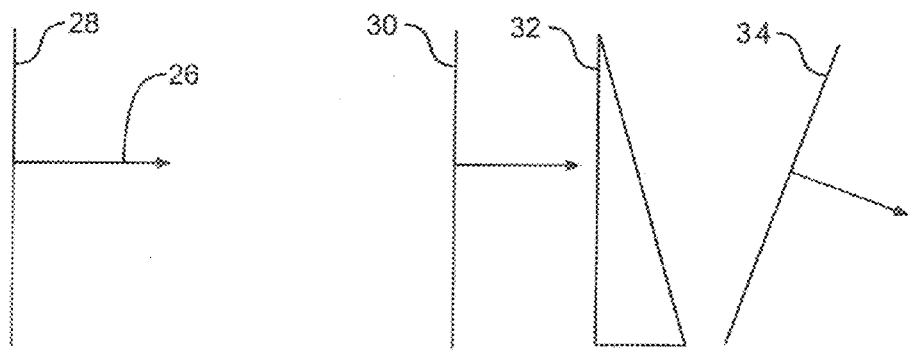
Fig. 3
Fig. 4

MOSAIC IMAGER USING WAVE FRONT CONTROL

CROSS-REFERENCE TO RELATED APPLICATIONS

This application is a divisional of pending U.S. patent application Ser. No. 11/782,547 filed on Jul. 24, 2007 now U.S. Pat. No. 7,576,308. The aforementioned patent application claims the benefit of the filing date of Jul. 28, 2006 for U.S. Provisional Application No. 60/833,970. Thus, this application also claims the benefit of the filing date of Jul. 28, 2006 for the aforementioned provisional application.

RIGHTS OF THE GOVERNMENT

The invention described herein may be manufactured and used by or for the Government of the United States for all governmental purposes without the payment of any royalty.

BACKGROUND OF THE INVENTION

This invention relates to adaptive optics and, more particularly, to the application of wave front control technology to image sensing and recording.

To optically sense or record an image, an object scene is imaged onto a single sensor. This is typically accomplished by collecting light reflected from the object scene and focusing that light onto the sensor, such as a charged coupled device or complementary metal oxide semiconductor imaging array. The image sharpness, technically known as image resolution, and the field of view are limited by the number of pixels in the sensor. The common method for overcoming this drawback is to piece together a composite image from separate images of parts of the whole image taken by changing the position of the imaging system relative to the object scene, and recording the image at each position. Although this method will increase the total number of pixels used to image the object scene, it can be time consuming, prone to operator error, and can also lead to gaps and seams appearing in between the separate images.

A common approach to obtaining a wider field of view is to use a wide angle lens to reduce the dimensions of an image to those compatible with the optical sensor. However, this degrades the resolution of objects within the field of view because the light reflected from the wider field of view is imaged onto the same number of pixels contained in the single imaging sensor.

In addition to the limit in resolution due to the limited number of pixels, a wide angle lens can introduce angle-dependent wave front errors, such as distortion, which is a variation in image magnification. The image may be in focus, but the scale is distorted at the extremities of the image. Other wave front errors such as field curvature, astigmatism, and coma can also increase with angulation and cause blurring of the image. Although, the optical aberrations caused by wave front errors can be minimized by designs well known to those skilled in the optical art, such modifications are complicated and expensive.

There is a need in the optical art for an image sensing and recording apparatus that provides high image resolution with a wide field of view, without seams and gaps, while also resolving the problems of wave front aberrations. The present invention addresses this need in the art.

SUMMARY OF THE INVENTION

A wave front control system ("WFCS") organizes an object scene into a mosaic comprised of a grid of segments and transmits each segment in a temporal sequence. The WFCS steers the light emanating from each segment, one segment at a time, through a series of optical components, and ultimately onto a digital imaging sensor. An optical recording device records each sensed segment, and the object scene is then composed by assembling the recorded segments.

The steering is accomplished without moving the imaging sensor. The WFCS also corrects wave front aberrations such as tilt, focus, coma and astigmatism that are unique to the angle between each segment and the optical axis of the imaging sensor.

In addition to utilizing a WFCS to correct aberrations caused by wave front errors, digital image processing techniques may be employed. In using the WFCS to remove wavefront tilt errors associated with an image segment, the aberration known in the art as distortion will be eliminated for one point—nominally the center point—within the image segment. Since the distorted image within the segment is in focus but scaled incorrectly, the digital image can be scaled, or morphed, to correct the distortion using digital processing techniques. For image recording, this can be accomplished by digitally morphing the recorded image to remove the distortion.

Other aspects and advantages of the present invention will become apparent from the following detailed description, taken in conjunction with the accompanying drawings, and illustrating by way of example the principles of the invention.

BRIEF DESCRIPTION OF THE DRAWINGS

FIG. 1 is a schematic illustration of an electromagnetic wave.

FIG. 2 is a schematic illustration of electromagnetic waves in phase with one another and shows a planar wave front.

FIG. 3 is an abbreviated schematic drawing of a propagating planar wave front.

FIG. 4 is a schematic illustration of a planar wave front having its direction changed by propagating through a prism.

DETAILED DESCRIPTION

Figure 5:
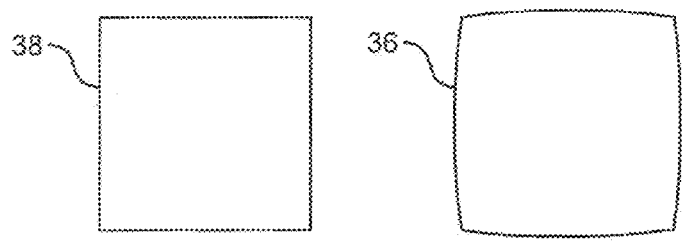
FIG. 5 is a schematic drawing showing an image distorted by errors introduced by a change in the wave front direction.

The invention utilizes optical wave front steering and wave front compensation to transmit an image from an object plane to a sensor with minimum distortion. The physical principles and terminology are explained in conjunction with the drawings, as follows. Light is comprised of electromagnetic waves. FIG. 1 is a graphical representation of an electromagnetic wave 22. Arrow 23 indicates the direction of wave propagation. A "wave front" is the surface defined by points of identical phase across the cross section of the light.

FIG. 2 shows electromagnetic waves 24 that are in phase with one another and propagating in the direction of arrows 26. When waves 24 are in phase as shown, the wave front is planar as represented in two dimensions by line 28. FIG. 3 is an abbreviated drawing of propagating wave front 28 that omits the graphical representation of the electromagnetic waves and shows only planar wave front 28 and arrow 26 representing the propagation direction. Generally speaking, a planar wave front is associated with a non-aberrant image.

A variation in optical path, introduced by a tilted or deformed mirror or a refractive medium such as glass, can delay parts of a propagating wave front. Wave front tilt, corresponding to a change in propagation direction, occurs when a planar wave front is linearly retarded across its face. FIG. 4 shows a planar wavefront 30 propagating through prism 32 and emerging as tilted planar wave front 34. When intentionally introduced to steer an image, tilt is a desired alteration of the wave front. The aberration known as distortion results when errors in wave front tilt occur across an image. For example, FIG. 5 shows distorted image 36 of square 38. The distortion occurring at the extremities of the image distorts the linear sides of square 38.

Figure 6:
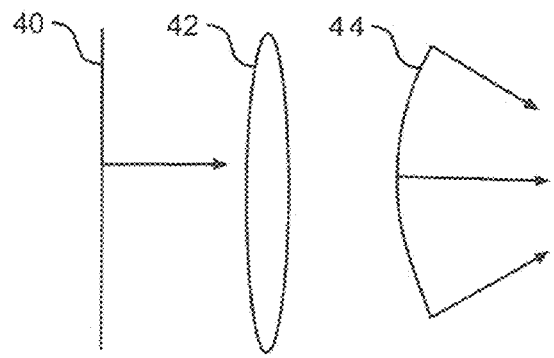
FIG. 6 is a schematic drawing of a planar wave front propagating through a convex lens and emerging as spherical wave front converging to a focus.

A curved mirror or lens that becomes thinner towards its edges, i.e., a convex lens, focuses a planar wave front by delaying the central part of the wave front with respect to the edges. FIG. 6 shows a planar wave front 40 propagating through convex lens 42 and emerging as spherical wave front 44 converging to a focus. Focusing an image is thus a desired alteration of a wave front.

Figure 7:
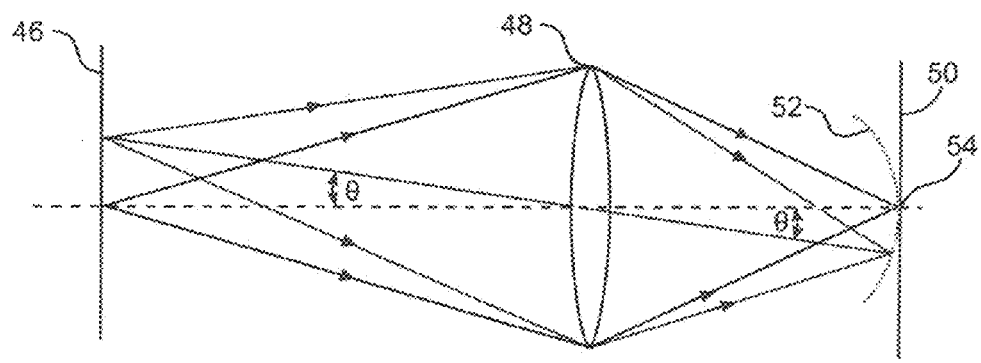
FIG. 7 is a schematic diagram illustrating the blurring effect of image field curvature occurring when an object lying in the object plane is imaged by a convex lens and projected onto a flat viewing screen.

FIG. 7 illustrates the effect of image field curvature. An object lying in object plane 46 is imaged by lens 48 and projected onto flat optical sensor 50. Lens 48 causes the light emanating from object plane 46 to form an in-focus image along the focal points forming locus 52. However, at flat optical sensor 50, the image of the object is only in focus near center 54, and is otherwise out of focus and thus blurred at viewing screen 50. The blurring increases with the radial distance from center 54, i.e., as the angle θ increases.

Figure 8:
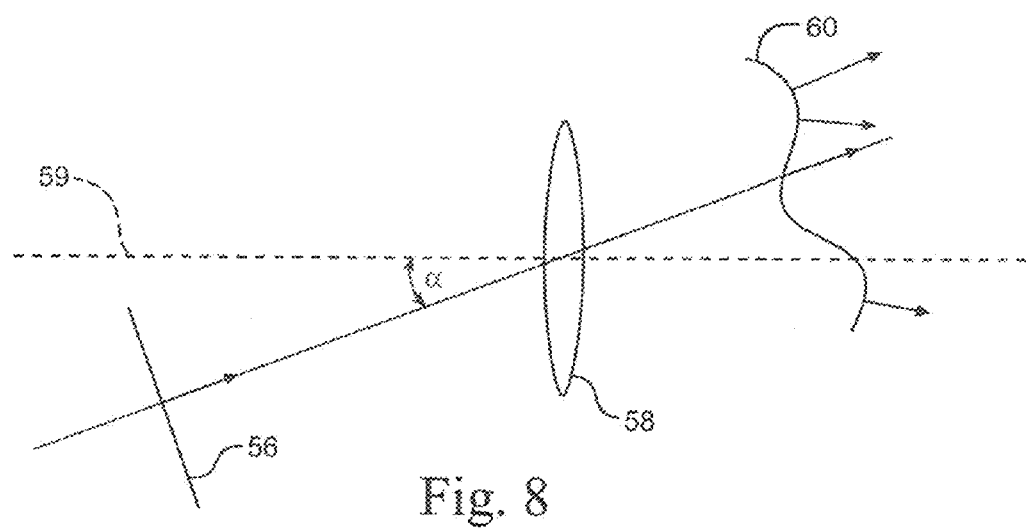
FIG. 8 is a schematic drawing of a planar wave front incident to a convex lens at an angle with respect to the optical axis, and emerging as an aberrant wave front.
Figure 9:
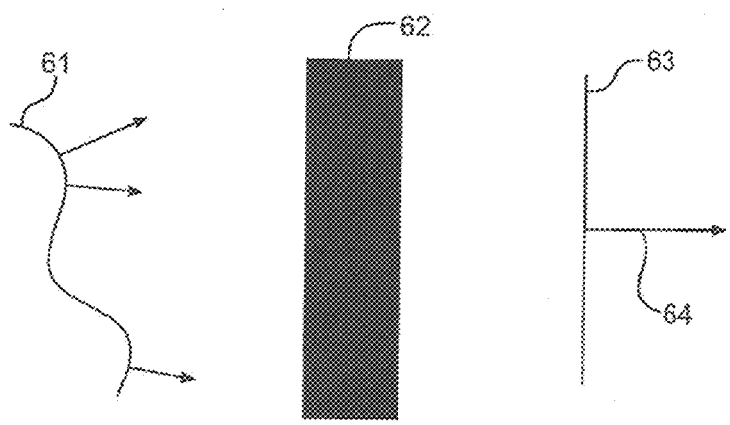
FIG. 9 is a schematic drawing of an aberrant wave front propagating through a wave front control device and emerging restored as planar wave front.

In addition to the angle-dependent wave front errors of distortion and field curvature, other angle-dependent wave front errors, such as coma and astigmatism, are associated with more complex irregularities. FIG. 8 shows planar wave front 56 incident to convex lens 58 at angle α with respect to optical axis 59. Wave front 56 emerges from lens 58 as aberrant wave front 60, and results in a blurred image. By introducing appropriate optical path delays across the wave front, a wave front control device ("WFCD") can compensate for such complex wave front irregularities. FIG. 9 shows aberrant wave front 61 propagating through WFCD 62 and emerging restored as planar wave front 63 propagating in direction 64.

Figure 10:
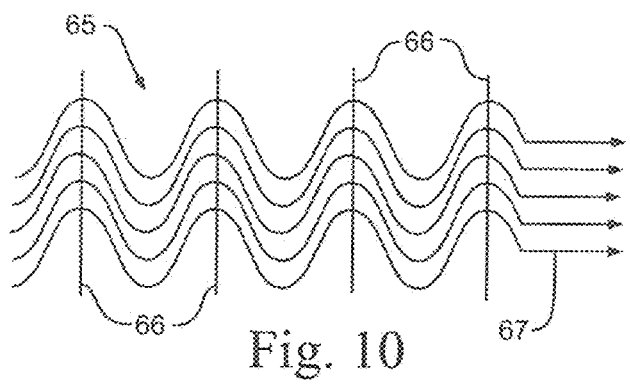
FIG. 10 is a schematic illustration of periodic electromagnetic waves in phase with one another and showing planar wave fronts.
Figure 11:
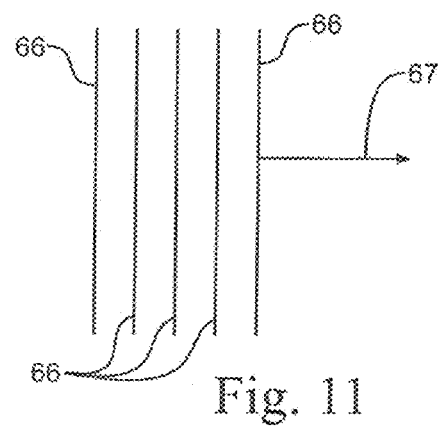
FIG. 11 is an equivalent abbreviated illustration of the propagating planar wave fronts shown in FIG. 10.

Diffractive principles, associated with the periodic nature of optical waves, may also be employed to steer optical wave fronts and compensate for wave front errors. FIG. 10 graphically depicts periodic electromagnetic waves 65, and figuratively demonstrates that the "wave front" is actually a series of wave fronts 66 propagating in direction 67 and spaced apart by the wavelength of the light. FIG. 11 is an equivalent illustration of wave fronts 66 propagating in direction 67, wherein the graphical representation of the electromagnetic waves is omitted.

Figure 12:
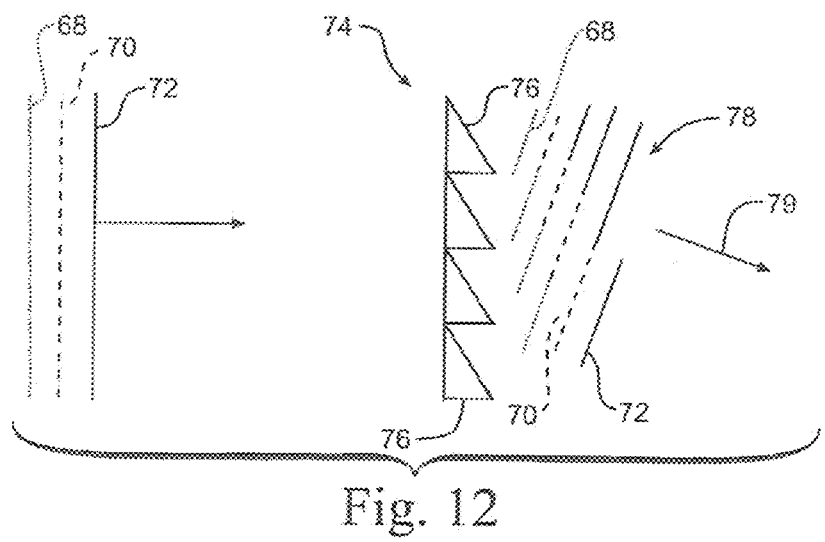
FIG. 12 is a schematic illustration of a planar wave front being steered by a diffractive optic comprised of an array of micro prisms.

FIG. 12 illustrates steering or tilting a planar wavefront utilizing diffractive principles. A succession of planar wavefronts 68, 70, and 72, respectively shown by the dotted, dashed, and solid lines, is incident upon diffractive optic 74, schematically shown as array of micro prisms 76. An individual micro prism refracts the wave fronts causing them to tilt, i.e., change their direction of propagation. The discontinuities at the prism boundaries cause discontinuities in each successive transmitted wave front. Diffracted wave fronts 78 propagating in new direction 79 are formed by locally refracted wave fronts being aligned with adjacent succeeding wave fronts. This technique is referred to as "modulo-lambda" (where lambda denotes both the width of the micro prisms and the optical wavelength) wave front control or "diffractive" wave front control.

In addition to tilting a wavefront as illustrated in FIG. 12, the same modulo-lambda principle may be applied to focus a wavefront and to compensate an aberration. This diffractive approach to wavefront control offers several advantages. Large range wavefront control may be achieved with low-range optical path modulation. This is illustrated in FIG. 12 where the widths of the micro prisms are approximately equal to an optical wavelength (or approximately 500 nanometers at visible wavelengths). Furthermore, a single high-resolution diffractive optical element can introduce simultaneously wavefront steering, focus, and aberration compensation. The foregoing is discussed in M. T. Gruneisen, R. C. Dymale, J. R. Rotge, and D. L. Lubin, "Near-diffraction-limited compensated imaging and laser wavefront control with programmable diffractive optics," in *High-Resolution Wavefront Control: Methods, Devices, and Applications IV*, John. D.

Gonglewski, Mikhail A. Vorontsov, Mark T. Gruneisen, Sergio R. Restaino, Robert K. Tyson, Editors, Proceedings of SHE 4825, 147-157 (2002).

Modulo-lambda wave front control can be implemented with programmable diffractive optics technologies, which allow reconfiguration of the diffractive optic in real time. Reconfigurable liquid-crystal diffractive optical devices with over one-million resolution elements are now commercially available at relatively low cost. Implementing diffractive wavefront control with these elements offers several noteworthy advantages, including no mechanical motion and hysteresis-free, wide dynamic range aberration correction, wavefront focusing, and wavefront steering. The foregoing is discussed in M. T. Gruneisen, J. R. Rotge, R. C. Dymale, and D. L. Lubin, "Programmable diffractive optics for wide-dynamic range wavefront control using liquid-crystal spatial light modulators," Opt. Eng., Vol. 43, No. 6, 1387-1393 (2004).

The present invention affects optical wave fronts by using time-dependent optical wave front steering, time-dependent optical wavefront focusing, and time-dependent optical wave front aberration compensation devices. The invention may include any combination of the foregoing devices and, in addition to the diffractive wave front control shown in FIG. 12, a number of them will be discussed below in conjunction with FIGS. 13-17. It is to be understood, however, that devices noted herein are not intended to comprise an exhaustive listing.

Figure 13:
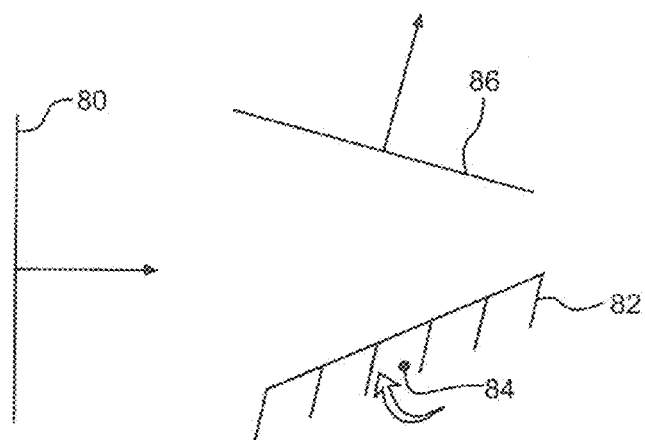
FIG. 13 is a schematic drawing of a rotatable steering mirror steering a planar wave front.
Figure 14:
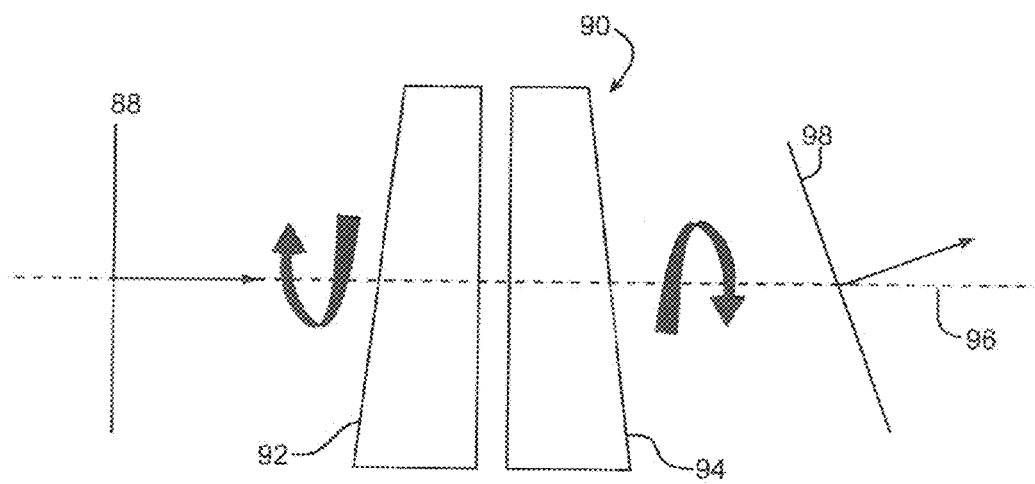
FIG. 14 is a schematic drawing of a Risley prism steering a planar wave front.

FIG. 13 illustrates planar wave front 80 incident upon a steering mirror 82, which is rotated about axis 84 in order to steer reflected wave front 86. FIG. 14 illustrates planar wave front 88 incident upon Risley prism 90 comprised of prisms 92 and 94 rotating about axis 96. Rotating prisms 92 and 94 steer transmitted wave front 98 in two dimensions. A detailed discussion of Risley prisms is provided by G. Garcia-Torales, M. Stronjnik and G. Paez, "Risley prisms to control wavefront tilt and displacement in a vectorial shearing interferometer," Applied Optics, Vol. 41, No. 7, 1380-1384 (1 Mar. 2002).

Figure 15:
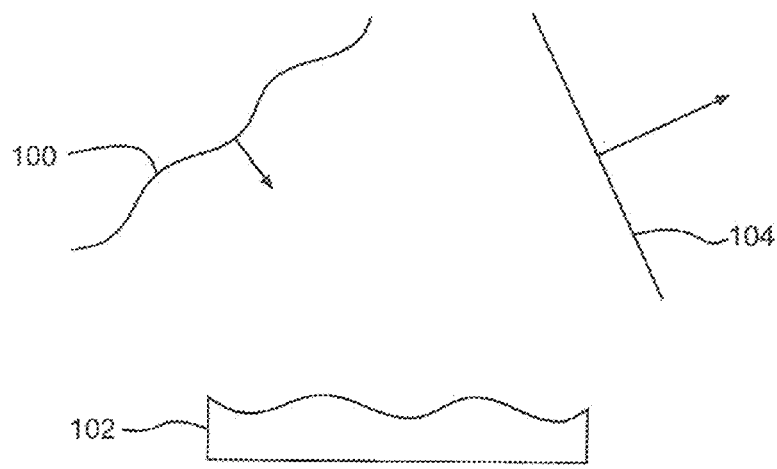
FIG. 15 is a schematic drawing of an aberrant wave front being steered and compensated by a deformable mirror comprised of a flexible reflective surface adjustably shaped by electro-mechanical means.

Presently, there are several technologies available for compensating time-dependent aberrations. The technologies described herein operate in real-time, allowing the wave front compensation to be updated at video frame rates or faster, i.e., at least sixty frames per second. Generally speaking, a wave front compensator can also steer a wave front over a limited range of angles. FIG. 15 illustrates aberrant wave front 100 incident upon deformable mirror 102 comprised of a flexible reflective surface adjustably shaped by electro-mechanical means. Mirror 102 is shaped to cause appropriate path delays to compensate for the aberration in wave front 100 and produce planar reflected wave front 104. The industry standard for this technology is based on piezo-ceramic actuated glass mirrors, and is prohibitively expensive for consumer products. Emerging technologies that offer the potential for lower cost mass produced deformable mirrors include electro-static deformable mirrors manufactured from silicon wafers utilizing micro-machined electro-mechanical system (MEMS) technologies and bimorph mirrors.

Figure 16:
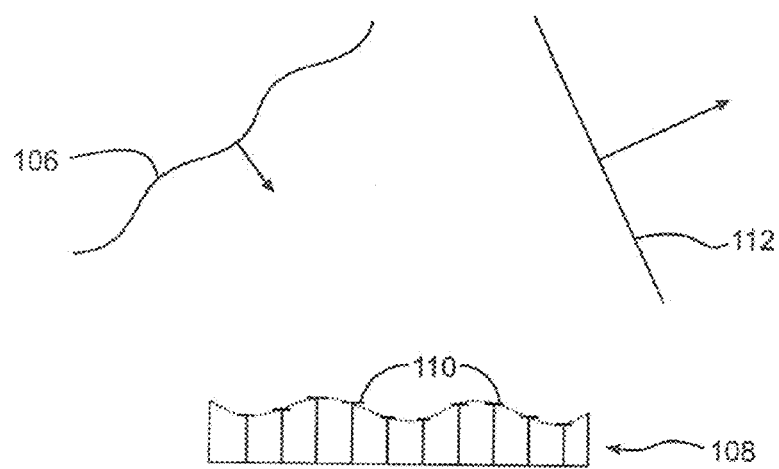
FIG. 16 is a schematic drawing of an aberrant wave front being steered and compensated by a segmented deformable mirror array comprised of a plurality of flat reflective segments moveable in one dimension by pistons.
Figure 17:
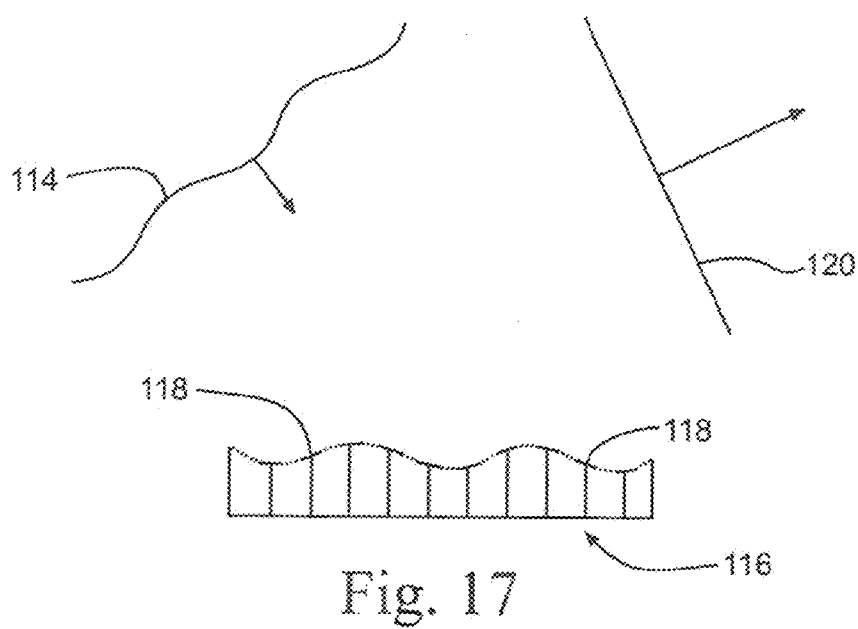
FIG. 17 is a schematic drawing of an aberrant wave front being steered and compensated by a segmented deformable mirror array comprised of flat reflective elements that are rotatable and also vertically moveable.

Currently available low-cost wave front control technology includes the segmented mirror arrays illustrated in FIGS. 16 and 17. In FIG. 16, aberrant wave front 106 is incident upon segmented deformable mirror 108 comprised of a plurality of flat reflective segments 110 moveable in one dimension by means of pistons to approximate the continuous surface of a conventional deformable mirror. Segments 110 are adjusted to produce a compensated nearly planar wave front 112. FIG. 17 illustrates aberrant wave front 114 incident upon segmented deformable mirror array 116 comprised of reflective elements 118 that can translate vertically by means of pistons, but are also rotatable, to better approximate the continuous surface of a conventional deformable mirror and thereby more accurately produce compensated planar wave front 120.

Figure 18:
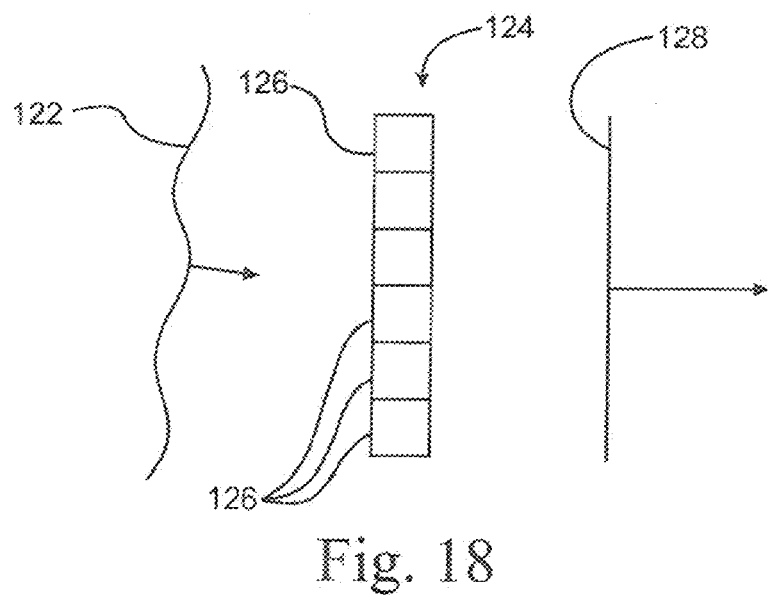
FIG. 18 is a schematic drawing of an aberrant wave front being compensated by a liquid crystal spatial light modulator comprised of regions having individually varied refractive indexes.

While the previous approaches achieve wave front control by changing the optical path length with prisms and reflective mirrors, the same effect can be achieved by modulating the refractive index in electro-optical media, for example, a reconfigurable liquid-crystal spatial light diffractive optical device. FIG. 18 illustrates aberrant wave front 122 incident upon liquid crystal spatial light modulator 124 comprised of regions 126. The refractive index is varied for each of regions 126 to introduce the appropriate optical path delays to create transmitted planar wave front 128. The aforementioned electro-optical apparatus controls optical wavefronts without any moving parts, offering distinct advantages where mechanical motion is problematic. The foregoing is discussed in M. T. Gruneisen, J. R. Rotge, R. C. Dymale, and D. L. Lubin, "Programmable diffractive optics for wide-dynamic range wavefront control using liquid-crystal spatial light modulators," Opt. Eng., Vol. 43, No. 6, 1387-1393 (2004); and G. Love, "Wave-front correction and production of Zernike modes with a liquid-crystal spatial light modulator," Applied Optics, Vol. 36, No. 7, 1517-1524 (1 Mar. 1997).

Figure 19:
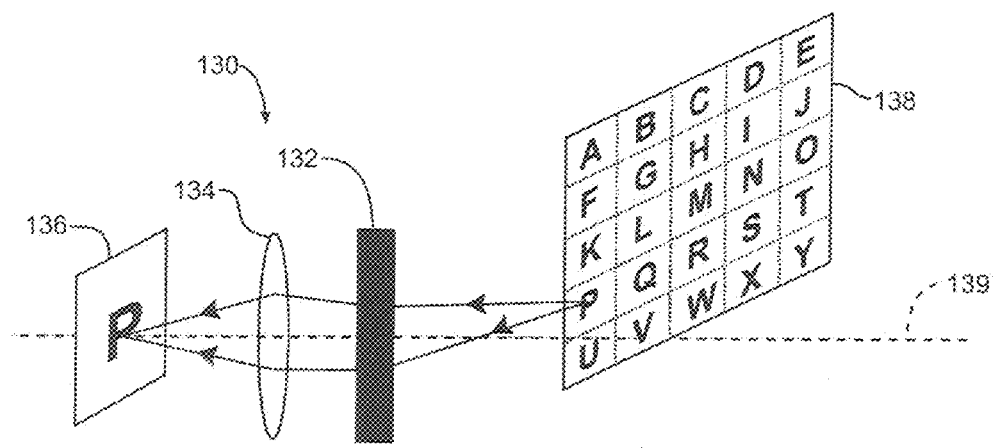
FIG. 19 is a schematic diagram of a mosaic imager of the present invention, which places a wave front control system at the entrance aperture to transmit a mosaic image from an object scene to a digital imaging sensor.

FIG. 19 illustrates imager 130 comprised of WFCS 132, imaging objective 134, and digital optical sensor 136. All of the aforementioned components transmit light reflected from object scene 138 along optical axis 139. Object scene 138 is comprised of twenty-five mosaic segments designated as A through Y. For each segment, for example, segment P, the light reflected therefrom is first transmitted by WFCS 132. Although WFCS 132 is shown as a light transmissive element, it could also be a reflective element.

WFCS 132 performs three distinct functions: wave front steering, focusing, and aberration correction. Wave front steering changes the direction of the impinging light so that light from different segments arriving from angles defined by the segment locations is directed along the optical axis 139 and through imaging objective 134. The steering may be accomplished by using any one of a number of devices well known to those skilled in the optical art, e.g., a steering mirror, Risley prism, micromirror array, deformable mirror or reconfigurable liquid crystal diffractive optical device. The wave front steering device is incorporated as a part of WFCS 132.

WFCS 132 also compensates for wave front aberrations specific to each of the object scene segments that would otherwise deleteriously affect the image of segment P received at digital imaging sensor 136. However, since the components of imager 130 lie along optical axis 139, there are no aberrations due to angles between the path the light follows in traveling between WFCS 132 and the other components of imager 130.

As the distance from each segment in object scene 138 to WFCS 132 differs, WFCS 132 introduces a sufficient amount of focus to allow imaging objective 134 to focus the light reflected from each of segments A through Y onto the digital imaging sensor 136, regardless of the magnitude of the respective differences in the distances. This focus is obtained by any of several optical apparatus well known to those skilled in the optical art, for example, a deformable mirror, a liquid crystal diffractive optical element, or a MEMS micromirror array. Such a focusing apparatus is incorporated into WFCS 132. In the case of the liquid crystal diffractive optical device, wavefront steering, focus, and aberration correction may be obtained with a single device.

In the aforementioned manner, each of segments A through Y of object scene 138 is sequentially transmitted onto digital image sensor 136. Digital image sensor 136 is a sensor including an array of pixels, with each pixel sensing the total amount of light incident upon that pixel, i.e., image detail is not resolved within a pixel. Each of the segments is imaged using all of the pixels of digital image sensor 136.

Each sensed segment is recorded using any one of a number of digital electronic recording devices well known to those skilled in the relevant art, e.g., a hard drive, random access memory or CD ROM. The object scene 138 may then be displayed or reproduced partially or in its entirety by displaying or reproducing some or all of the segments as a mosaic by using any one of a variety of digital display devices or printers known in the art.

In imager 130, the amount of light transmitted through imaging objective 134 is limited by the dimensions of WFCS 132. This makes WFCS 132 the "aperture stop" for the optical system. Since wavefront control technologies vary considerably in size and can be as small as a few millimeters in some cases, this can pose a limitation on the light gathering ability of imager 130.

Figure 20:
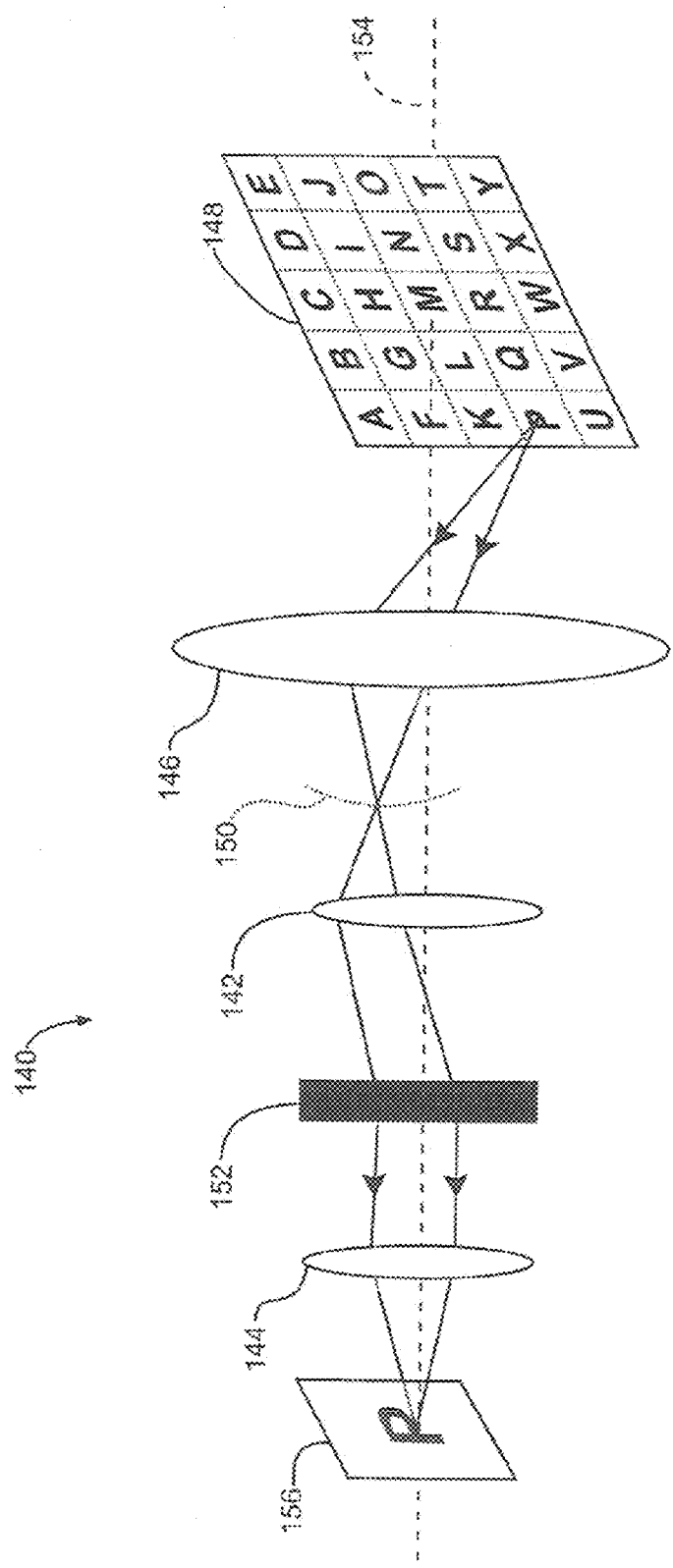
FIG. 20 is a schematic diagram of another embodiment of the present invention, which places an imaging objective at the entrance aperture and before a wave front control system, to transmit a mosaic image from an object scene to a digital imaging sensor.

FIG. 20 is a schematic drawing of imager 140, an embodiment of the present invention that avoids the aforementioned limitation. Imager 140 includes all of the components previously discussed with respect to imager 130, with the addition of relay optics 142 and 144. However, the components are configured to affect and process the light emitted from the object scene in a different sequence.

Light reflected from object scene 148 is first transmitted through imaging objective 146, which focuses the light onto image arc 150. The light from the segments is focused on arc 150 rather than a plane, due to the differing distances between imaging objective 146 and the respective mosaic segments comprising object scene 148. This is the field curvature aberration described previously in conjunction with FIG. 7. The light is then transmitted through relay optic 142, which collimates the light onto WFCS 152.

Relay optic 142 also reduces the size of the image transmitted by imaging objective 146, to WFCS 152. This transmits the wave front characteristics incident upon imaging objective 146 while reducing the height and width of the wave front at imaging objective 146 to match the height and width of the WFCS 152. The reversed positions of the imaging objective and the WFCS in imager 140 relative to imager 130 thus make imaging objective 146 the aperture stop for this embodiment. Since imaging objective 146 can more easily be scaled to larger sizes than is possible for WFCS 152, more light can be made available to image sensor 156, relative to image sensor 136 in imager 130.

As previously discussed with respect to WFCS 132, WFCS 152 performs three distinct functions: wave front steering, focusing, and aberration correction. Wave front steering changes the direction of incident wave fronts so that light from different segments, e.g., segment P, can be directed and focused onto relay optic 144. This design differs from that of imager 130, where the light transmitted by imaging objective 138 travels along optical axis 139 after being steered by WFCS 132.

In imager 140, the wave fronts associated with off-axis segments are incident upon imaging objective 146 and relay optic 142 at various angles that result in aberrations specific to each segment. Such segment-specific aberrations are in addition to aberrations inherent to the optical system. WFCS 152 incorporates apparatus to compensate for aberrations from both of the aforementioned sources. This is in contrast to imager 130, where the wave front angle at the location of optic 134 relative to optical axis 139 is minimal. In the case of the liquid crystal diffractive optical device, wavefront steering, focus, and aberration correction may be obtained with a single apparatus.

The light is then transmitted through relay optic 144, which creates and focuses an image of each image segment, in sequence, on digital optical sensor 156. Each sensed segment may then be recorded using any one of a number of digital electronic recording devices well known to those skilled in the relevant art. Object scene 148 may be subsequently displayed or reproduced partially or in its entirety by displaying or reproducing some or all of the segments as a mosaic by using any one of a variety of digital display devices or printers known in the art.

In imager 140, the maximum path angle relative to optical axis 154 from which object scene light may be imaged with high clarity will be limited by several factors, including angle-dependent aberrations that exceed the corrective capability of WFCS 152, and vignetting, where light propagating at large angles through the system physically miss impinging the optical components and are ejected from the optical system. Imager 160, a third embodiment of the present invention, utilizes two wavefront control systems to ameliorate the foregoing limitations.

Figure 21:
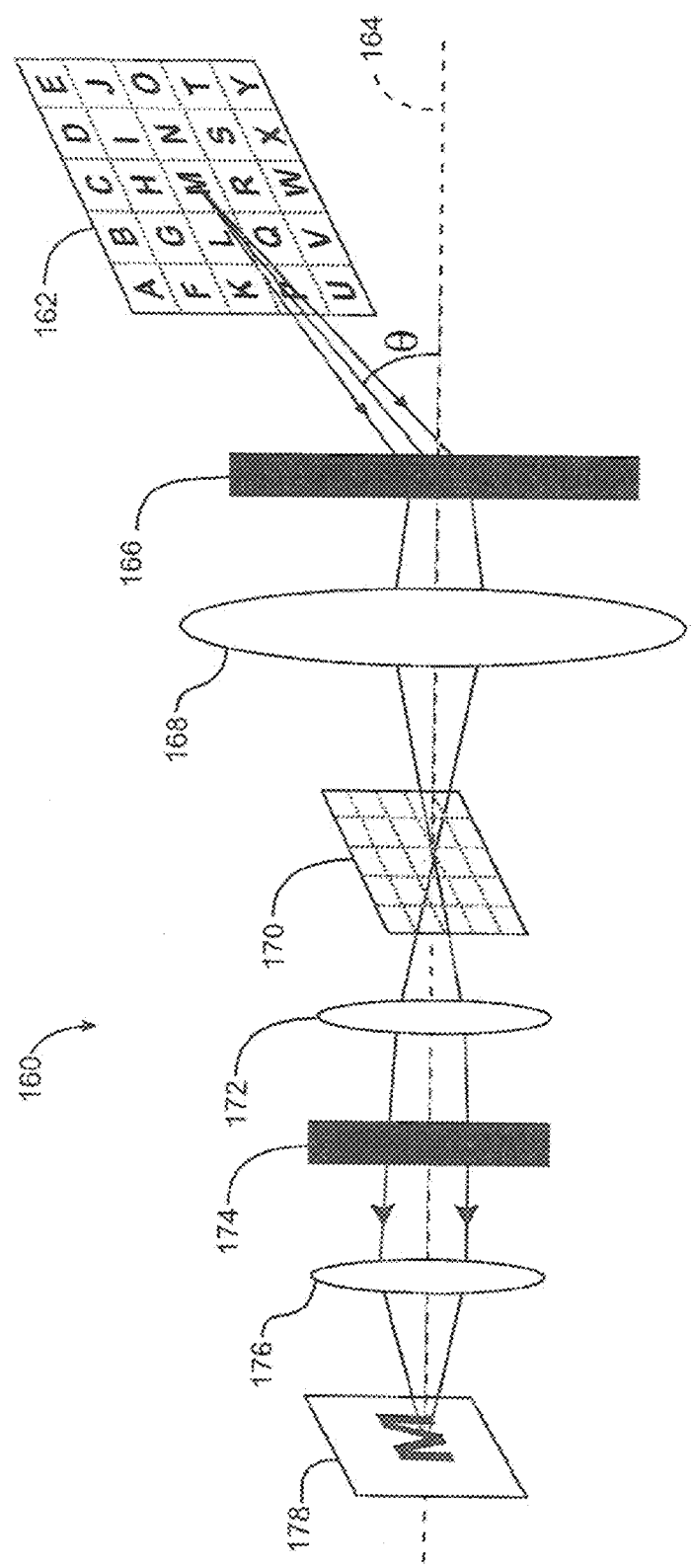
FIG. 21 is a schematic diagram of a third embodiment of the present invention, which uses two wave front control systems along the optical axis to transmit a mosaic image from an object scene to a digital imaging sensor.

Referring to FIG. 21, light emanating from the center of object scene 162 (segment M) and entering WFCS 166 where optical axis 164 intersects WFCS 166, subtends the angle θ relative to optic axis 164. WFCS 166 is a large aperture steering mirror that steers the wave front from the large angle θ, to a new direction nominally along optical axis 164, thereby minimizing aberrations associated with the center of object scene 162. WFCS 166 is the aperture stop in imager 160.

Imaging objective 168 forms an intermediate image of object scene 162 centered at on-axis focus 170 and transmits the light to relay optic 172. Relay optic 172 collimates the light and reduces the size of the image transmitted by imaging objective 168 to WFCS 174. This transmits the wave front characteristics incident upon imaging objective 168 while reducing the height and width of the wave front at imaging objective 168 to match the height and width of the WFCS 174. This allows the aberration compensation function to be performed with a smaller component, i.e., WFCS 174, than imaging objective 168. WFCS 174 can also correct aberrations that might be introduced by imaging objective 168.

WFCS 174 may also introduce wavefront tilt about an axis normal to optical axis 164, to receive image segments in the vicinity of nominal angle θ and compensate for angle-dependent aberrations such as focus, astigmatism, and coma. In the case where WFCS 174 is a liquid crystal diffractive optical device, wavefront steering, focus, and aberration correction may be obtained with a single apparatus. WFCS 174 then individually transmits each of the image segments to relay optic 176, which in turn focuses and transmits the image segments, in sequence, onto imaging sensor 178. If the angular range of WFCS 174 reaches its limit, WFCS 166 can be tilted to a new nominal angle in order to continue the mosaic imaging process.

Each sensed segment may then be recorded using any one of a number digital electronic recording devices well known to those skilled in the relevant art. Object scene 162 may be subsequently displayed or reproduced partially or in its entirety by displaying or reproducing any or all of the segments as a mosaic using any one of a variety of digital display devices or printers known in the art.

It is to be understood that the preceding is merely a detailed description of several embodiments of this invention and that numerous changes to the disclosed embodiments may be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An adaptive optics apparatus for transmitting segments of an object scene, comprising:
    a first wave front control means, an imaging objective, a first relay optic, a second wave front control means, a second relay optic, and an optical sensor;
    the first wave front control means being for successively steering wave fronts emanating, respectively, from each segment onto the imaging objective;
    the imaging objective being for successively transmitting and focusing incident wave fronts emanating, respectively, from each segment onto the first relay optic;
    the first relay optic being for successively transmitting and focusing incident wave fronts emanating, respectively, from each segment, onto the second wave front control means;
    the second wave front control means being for successively steering and focusing incident wave fronts emanating, respectively, from each segment onto the second relay optic, and for correcting aberrations in incident wave fronts; and
    the second relay optic being for focusing incident wave fronts emanating, respectively, from each segment onto the optical sensor.

2. An adaptive optics apparatus as defined in claim 1, further comprising: an optical axis; wherein the first wave front control means is rotatable about a first axis of rotation intersecting and lying normal to the optical axis.

3. An adaptive optics apparatus as defined in claim 2 wherein the second wave front control means is rotatable about a second axis of rotation intersecting and lying normal to the optical axis.

4. An adaptive optics apparatus as defined in claim 3, wherein the imaging objective is for successively transmitting and focusing incident wave fronts that have been respectively transmitted by the first wave front control means.

5. An adaptive optics apparatus as defined in claim 4, wherein the first relay optic is for successively transmitting and focusing incident wave fronts that have been transmitted by the imaging objective.

6. An adaptive optics apparatus as defined in claim 5, wherein the second wave front control means is for successively steering and focusing incident wave fronts that have been transmitted by the first relay optic.

7. An adaptive optics apparatus as defined in claim 6, wherein the second relay optic is for successively focusing incident wave fronts that have been transmitted by the second wave front control means.

8. An adaptive optics apparatus as defined in claim 3, further comprising means for composing at least part of the object scene from a plurality of the segments having wave fronts sensed by the optical sensor.

9. An adaptive optics apparatus as defined in claim 8, wherein:
    the composing means is comprised of means for recording wave fronts respectively emanating from segments of the object scene and being sensed by the optical sensor, to create recorded images; and
    means for composing at least a part of the image scene from the recorded images.

10. An adaptive optics apparatus as defined in claim 9, wherein the first wave front control means is comprised of a first reconfigurable liquid crystal diffractive optical device.

11. An adaptive optics apparatus as defined in claim 10, wherein the second wave front control means is comprised of a second reconfigurable liquid crystal diffractive optical device.

12. A method for optically transmitting an object scene to an optical sensor, comprising:
    dividing the object scene into a mosaic of segments:
    steering wave fronts emanating from one of the segments onto an imaging objective;
    focusing wave fronts incident upon the imaging objective and transmitting, them onto a first relay optic;
    focusing wave fronts incident upon the first relay optic and transmitting them onto a first wave front control means;
    focusing and correcting aberrations in wave fronts incident upon the first wave front control means and transmitting them onto a second relay optic;
    focusing wave fronts incident upon the second relay optic, and transmitting them onto an optical sensor; and
    successively repeating the sequence of steps for each of the segments.

13. An optical method as recited in claim 12, further comprising:
    creating a recorded image from the wave fronts emanating from each of the segments respectively sensed by the optical sensor; and
    composing at least a part of the object scene from the recorded images.

* * * * *